(12) United States Patent
Fitch et al.

(10) Patent No.: US 7,851,704 B2
(45) Date of Patent: Dec. 14, 2010

(54) MODULAR WIRING SYSTEM

(75) Inventors: William H Fitch, Spring Branch, TX (US); Thomas B McNeill, Houston, TX (US)

(73) Assignee: Quikbox, Inc., Houston, TX (US)

( * ) Notice: Subject to any disclaimer, the term of this patent is extended or adjusted under 35 U.S.C. 154(b) by 402 days.

(21) Appl. No.: 11/680,763

(22) Filed: Mar. 1, 2007

(65) Prior Publication Data
US 2008/0210465 A1    Sep. 4, 2008

(51) Int. Cl.
*H01H 9/02* (2006.01)
(52) U.S. Cl. .............................. 174/53; 174/50; 174/59; 174/64; 439/535
(58) Field of Classification Search ................. 174/480, 174/481, 50, 53, 57, 58, 59, 64; 220/3.2–3.9, 220/4.02; 439/535, 536, 596, 547, 107
See application file for complete search history.

(56) References Cited

U.S. PATENT DOCUMENTS

| | | | | |
|---|---|---|---|---|
| 2,433,917 | A | * | 1/1948 | McCartney .................. 174/53 |
| 2,828,394 | A | | 3/1958 | Mayzik |
| 3,609,647 | A | * | 9/1971 | Castellano .................. 439/535 |
| 3,707,697 | A | * | 12/1972 | Izumi ......................... 439/107 |
| 3,879,101 | A | * | 4/1975 | McKissic .................... 439/535 |
| 4,165,443 | A | | 8/1979 | Figart et al. |
| 4,399,371 | A | | 8/1983 | Ziff |
| 4,725,249 | A | | 2/1988 | Blackwood et al. |
| 4,842,551 | A | | 6/1989 | Heimann |
| 4,875,871 | A | | 10/1989 | Booty, Sr. et al. |
| 4,918,258 | A | | 4/1990 | Ayer |
| 4,924,032 | A | | 5/1990 | Akins |
| 4,958,048 | A | | 9/1990 | Bell |
| 5,117,122 | A | | 5/1992 | Hogarth et al. |
| 5,326,933 | A | | 7/1994 | Freundner et al. |
| 5,399,806 | A | | 3/1995 | Olson |
| 5,430,251 | A | | 7/1995 | Freundner et al. |
| 5,471,012 | A | | 11/1995 | Opel |
| 5,485,356 | A | * | 1/1996 | Nguyen ........................ 174/66 |
| 5,735,710 | A | | 4/1998 | Blaauboer et al. |
| 5,785,551 | A | | 7/1998 | Libby |
| 6,156,971 | A | | 12/2000 | May |
| 6,259,023 | B1 | | 7/2001 | Reiker |
| 6,309,248 | B1 | | 10/2001 | King |

(Continued)

OTHER PUBLICATIONS

PCT International Search Report for International Application No. PCT/US2008/055400 filed Feb. 29, 2008.

*Primary Examiner*—Angel R Estrada
(74) *Attorney, Agent, or Firm*—Mark E. Scott; Conley Rose, P.C.

(57) ABSTRACT

A modular wiring system and method. At least some of the illustrative embodiments are systems comprising an electrical box having a first side wall, a second side wall and a back, and an opening through the first side wall (the side walls and the back define an internal cavity). The system further comprises an electrical backing insert comprising at least six electrically conductive paths, the at least six electrically conductive paths extending from a first end of the electrical backing insert to at least a medial portion of the electrical backing insert. The electrical backing insert is releasably coupled within the internal cavity, and wherein the at least six electrically conductive paths on the first end of the electrical backing insert are accessible through the opening on the first sidewall.

20 Claims, 9 Drawing Sheets

U.S. PATENT DOCUMENTS

| | | |
|---|---|---|
| 6,331,933 B1 | 12/2001 | Rumney |
| 6,444,906 B1 * | 9/2002 | Lewis .......................... 174/53 |
| 6,583,353 B2 | 6/2003 | Murakoshi |
| 6,617,511 B2 * | 9/2003 | Schultz et al. ................ 174/53 |
| 6,939,179 B1 * | 9/2005 | Kieffer et al. ............... 439/724 |
| 6,945,815 B1 * | 9/2005 | Mullally .................... 439/535 |
| 7,160,147 B1 * | 1/2007 | Stephan ...................... 439/535 |
| 7,273,392 B2 * | 9/2007 | Fields ........................ 439/535 |
| 7,365,964 B2 * | 4/2008 | Donahue, IV ............... 361/622 |
| 7,425,677 B2 * | 9/2008 | Gates et al. ................... 174/50 |
| 2001/0020534 A1 | 9/2001 | May |
| 2001/0023769 A1 | 9/2001 | May |

* cited by examiner

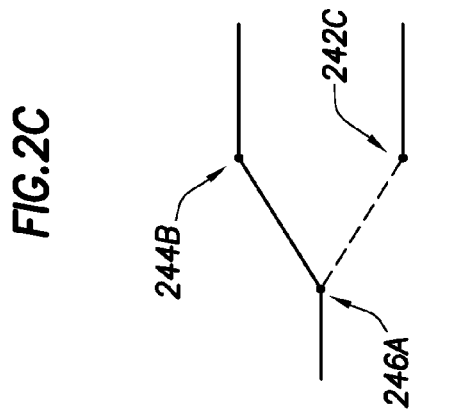
FIG.2C
FIG.2D
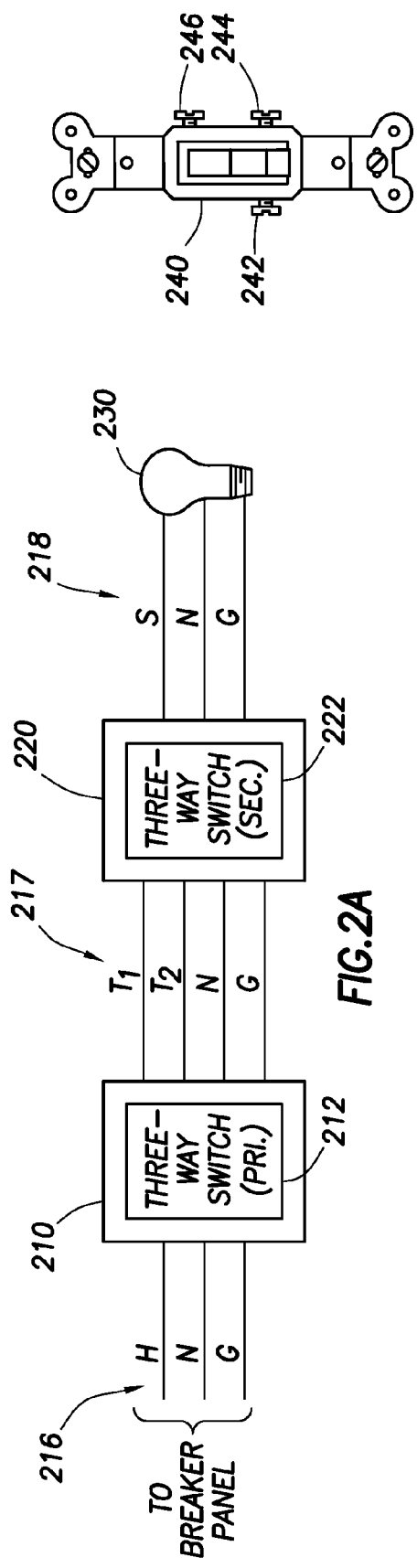
FIG.2A
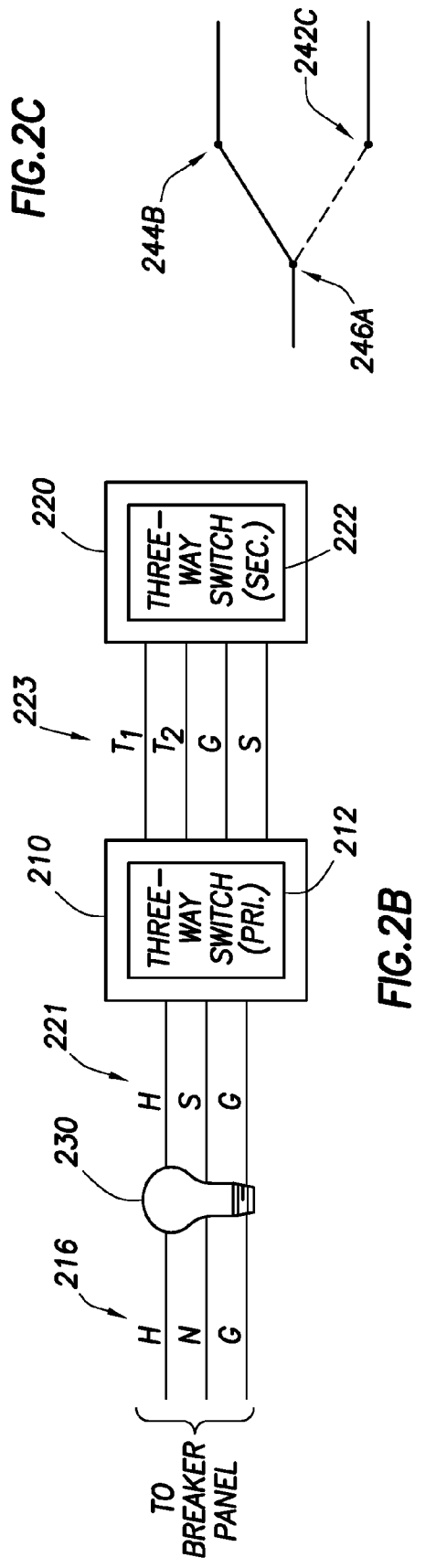
FIG.2B

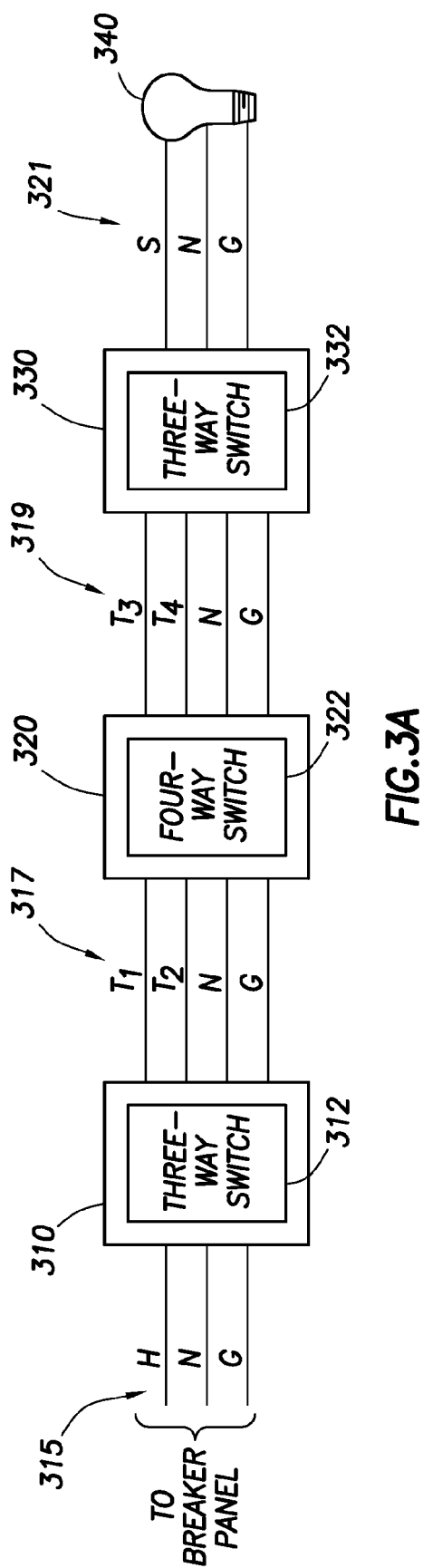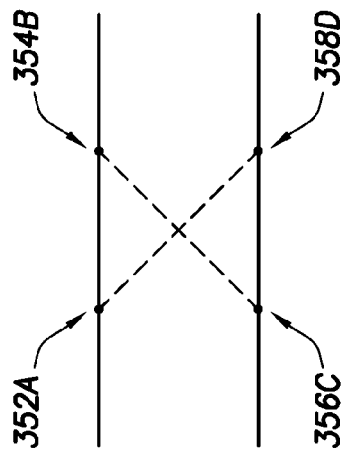
FIG.3A
FIG.3B
FIG.3C

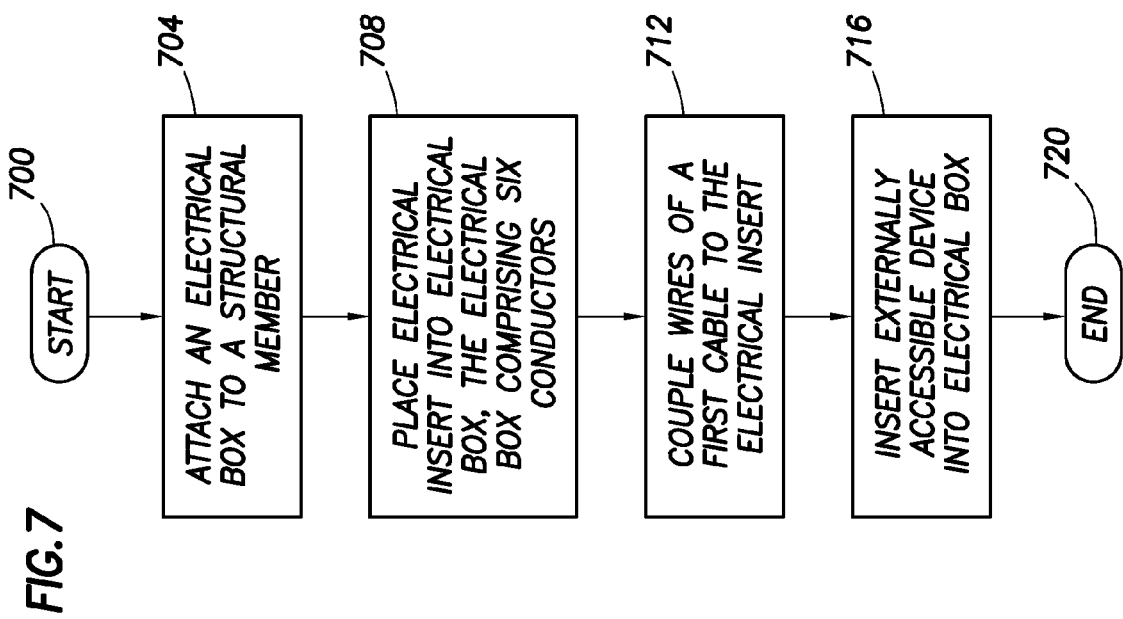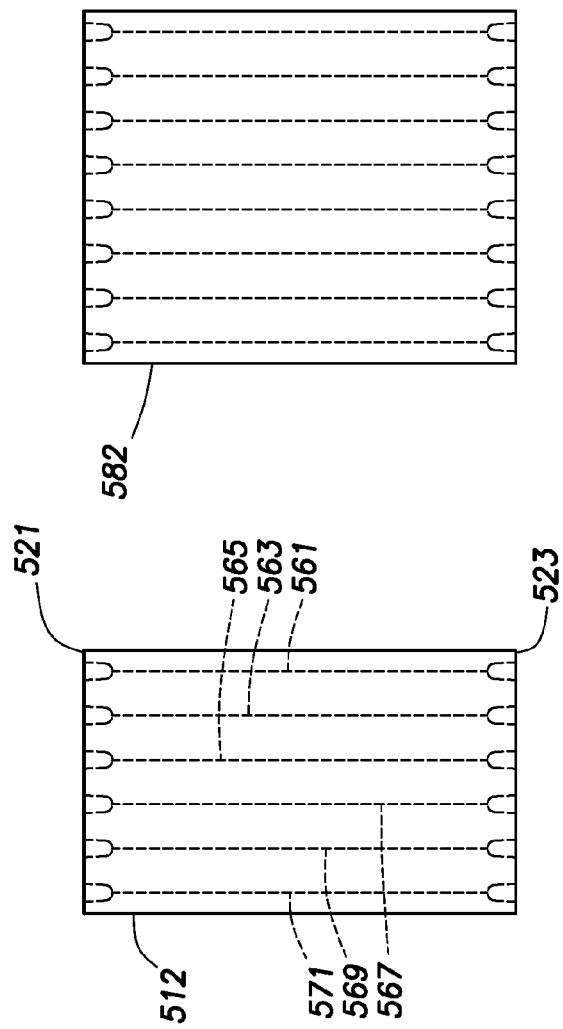

MODULAR WIRING SYSTEM

BACKGROUND

Installing an electrical system in a residential or commercial setting can be a complex and costly procedure which involves installing junction boxes, plugs, switches and light fixtures, and running cable (e.g., ROMEX cable) from a main breaker panel to each junction box. Oftentimes, the locations of the plugs, switches and light fixtures are first determined, and appropriate junction boxes are nailed or otherwise affixed to studs at appropriate locations. Holes are drilled through the studs, and one or more cables are run from the breaker panel through the drilled holes and into each junction box. At this point the cable is not receiving power, and the one or more cables are rolled up and manually tucked inside each junction box until drywall is installed, taped, floated, and painting has been completed, so that such activities do not damage the electrical plugs, switches, or other fixtures. Thereafter, the one or more cables are unrolled, trimmed, and an end portion of an outer sheath of each of the cables is removed, exposing a plurality of insulated conductors. Each of the plurality of insulated conductors may then have the insulation stripped from an end portion, and the exposed conductor can then be coupled to a screw located on a plug, switch or other fixture, or the exposed conductor can be coupled to another exposed conductor (e.g., from a different cable that has been run to the same junction box) for example, by way of a screw-on electrical twist-on wire connector. The one or more cables and associated connectors are then pushed back into the junction box. Thereafter, the plugs, switches, lights/light fixtures are installed and properly connected, and power is provided to the system.

Such a method of installing an electrical system provides ample opportunity for human error. Moreover, it is quite time-consuming to run cable throughout the structure, remove the outer sheath, strip the insulation off the conductors, and connect individual conductors to plugs, switches, other fixtures, or to other conductors by wrapping individual conductors around screws or by using a connector such as a screw-on electrical twist-on wire connector. All of the cable, conductors, and connectors within a junction box thus create an overflow that is dangerous and complex. Current wiring methods are thus unreliable in that rework may need to be performed to correct mistakes made during the wiring process. Furthermore, current wiring methods are unsafe in that there is not adequate protection against crossed wires, short circuits, wire breakage, or other potential hazards. The multitude of wires that are involved and the number of connections that are made calls for a skilled electrician; however, given the complexity of the system and the limitations of current wiring methods, even a skilled electrician may improperly wire, or be forced to rewire, portions of the electrical system.

In addition, the current method of installing an electrical system calls for installing the plugs, switches, and fixtures after the drywall installation is complete. Thus, if there is a short circuit in the cable running behind the drywall, if there is a broken wire, if there is a circuit failure, or if there is any other electrical problem, such a problem will not be discovered until the power is applied after the drywall has been installed, and repairing the problem is going to call for an expensive tear out and rework of the drywall. In some cases, temporary power is needed to advance construction of a structure (e.g., for work lamps, power tools, or other construction equipment). However, since existing wiring methods do not allow for electrical circuits to be utilized until drywall is installed and painting is completed, and after an electrician has properly connected all circuitry and switches, plugs, and lights/light fixtures, temporary power is often provided to a worksite in a haphazard way using improvised circuitry which can lead to accidents or close calls.

SUMMARY

The problems noted above are solved in large part by a modular wiring system and method. At least some of the illustrative embodiments are systems comprising an electrical box having a first side wall, a second side wall and a back, and an opening through the first side wall (the side walls and the back define an internal cavity). The system further comprises an electrical backing insert comprising at least six electrically conductive paths, the at least six electrically conductive paths extending from a first end of the electrical backing insert to at least a medial portion of the electrical backing insert. The electrical backing insert is releasably coupled within the internal cavity, and wherein the at least six electrically conductive paths on the first end of the electrical backing insert are accessible through the opening on the first sidewall.

Other illustrative embodiments are methods comprising attaching an electrical box to a structural member, placing a backing insert into the electrical box (the backing insert comprising a plurality of electrical conductors), coupling a plurality of wires of a first cable to the backing insert (the coupling through a first aperture of the electrical box, and the wires of the first cable coupled to particular electrical conductors of the backing insert selected based on a function to be performed by the electrical box), and inserting an externally accessible device into the electrical box (the act of inserting couples the externally accessible device to at least some of the electrical conductors of the backing insert).

BRIEF DESCRIPTION OF THE DRAWINGS

For a detailed description of various embodiments, reference will now be made to the accompanying drawings in which:

FIG. 2 (comprising FIGS. 2A-2D) illustrates a system comprising a three-way switch;

FIG. 3 (comprising FIGS. 3A-3C) illustrates a system comprising a four-way switch;

FIG. 7 illustrates a flow diagram in accordance with embodiments of the invention.

NOTATION AND NOMENCLATURE

Figure 1A:
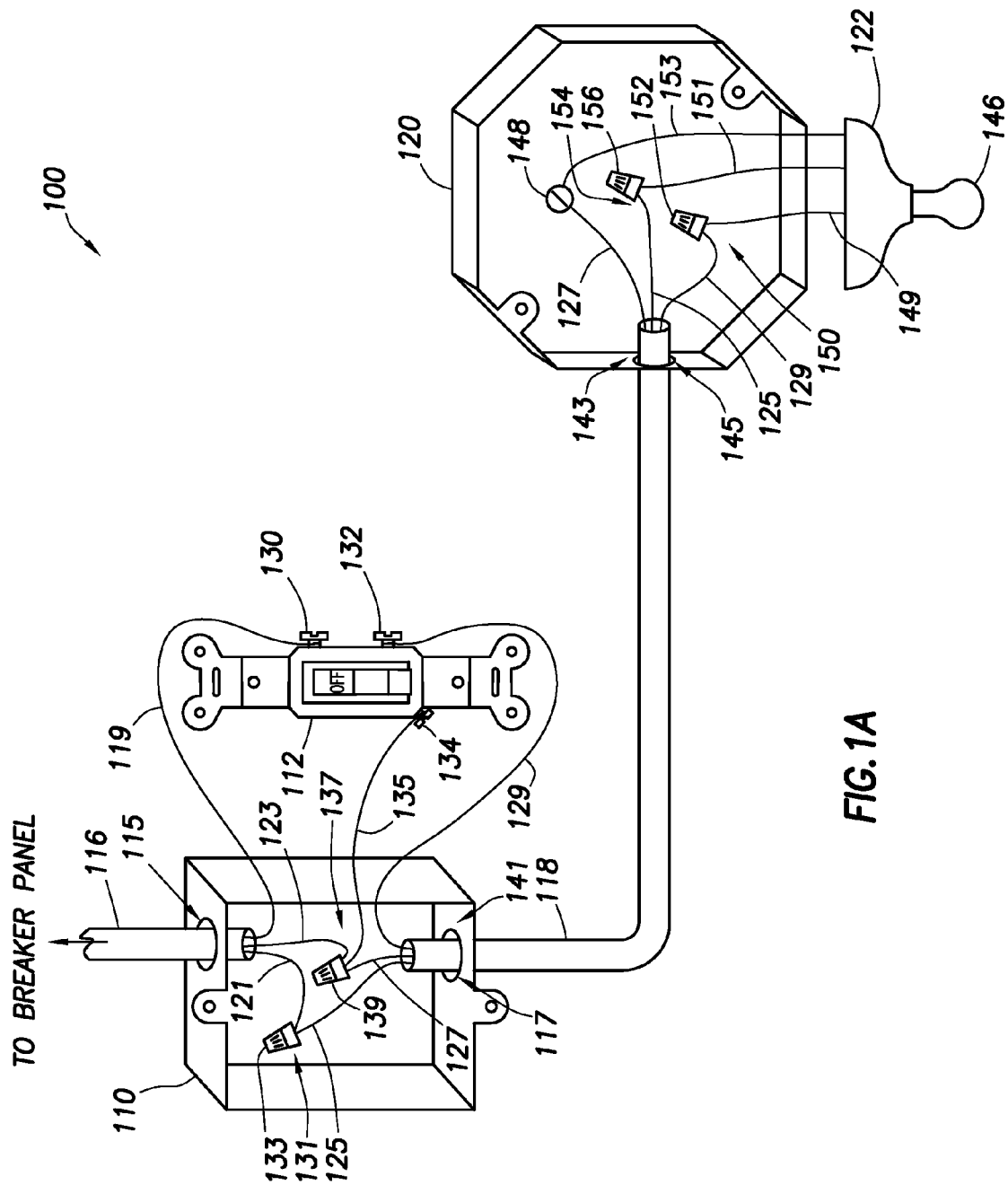
FIG. 1 (comprising FIGS. 1A-1E) illustrates a system comprising a two-way switch.

Certain terms are used throughout the following description and claims to refer to particular system components. This document does not intend to distinguish between components that differ in name but not function.

In the following discussion and in the claims, the term "comprises" and "comprising" are used in an open-ended fashion, and thus should be interpreted to mean "including, but not limited to . . . ". Also, the term "couple" or "couples" is intended to mean either an indirect or direct electrical or mechanical connection, as the context requires. Thus, if a first device couples to a second device, that connection may be through a direct connection, or through an indirect connection via other devices and connections.

Further, the term "side wall" means not only straight side walls, but also curved and segmented side walls. Thus, a round junction box has a side walls. Likewise, a segmented junction box (e.g., octagonal), has side walls.

DETAILED DESCRIPTION

Embodiments of the disclosed systems and methods relate to a modular wiring system used during installation of an electrical system in residential or commercial applications. In particular, the modular wiring system comprises an electrical junction box and an electrical backing insert. The electrical backing insert comprises at least six electrically conductive paths (which conductive paths replace the loose wiring found in junction boxes wired in accordance with former practice), and the electrical backing insert is releasably coupled within the junction box. A cable (e.g., ROMEX or NM cable) comprising a plurality of wires is quickly and easily coupled to the electrical backing insert (e.g., by way of a connector that couples to the cable, and the electrical backing insert comprising a mating connector). In addition, each of the at least six electrically conductive paths is dedicated to a particular function. In some embodiments, the at least six electrically conductive paths are arranged in a predetermined sequence to allow for reliable and consistent connections to the electrical junction box.

Having at least six electrically conductive paths through the electrical backing insert is a result of determining how many connection points to the junction box, and thus conductive paths within the junction box, are desirable in order to accommodate most wiring circuits in a residential or commercial installation without having to reuse, or alternate the use of, any single connection point or conductive path within the junction box. Thus, in embodiments of the present invention each of the at least six electrically conductive paths is dedicated to a particular function. The following discussion of an electrical circuit that provides power to a light fixture, as well as various wiring schemes that may be used in circuits comprising light fixtures, switches, or electrical receptacles among others, is presented in order to more fully appreciate the desirability of having at least six electrically conductive paths within the electrical junction box.

Figure 1D:
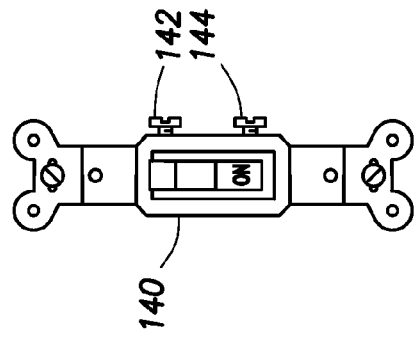
Figure 1E:
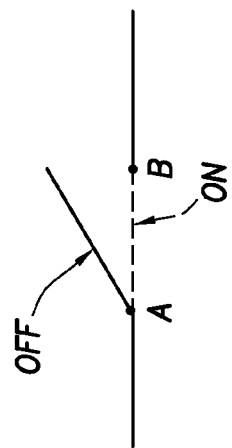

FIG. 1A illustrates an electrical circuit 100 comprising a junction box 110, a two-way switch 112 (e.g., single-pole-single-throw (SPST) switch, shown in an "off" position), a junction box 120, and a light fixture 122. The light fixture 122 is coupled to a lamp 146 and may comprise a housing, a reflector, and a socket. The junction box 110 and the junction box 120 may comprise metallic junction boxes, plastic junction boxes, or combinations thereof. The two-way switch 112 comprises a first contact screw 130, a second contact screw 132, and a grounding screw 134. FIG. 1D illustrates a two-way switch 140 (in an "on" position) comprising a first contact screw 142 and a second contact screw 144, but no grounding screw. A two-way switch 140 without a grounding screw may be used in conjunction with a metallic junction box, wherein the circuit is grounded to the junction box itself. The operation of a two-way switch is illustrated in FIG. 1E. Specifically, with the switch in the "off" position the circuit is open, there is no contact between point "A" and point "B", and thus there is no current flow between the two contact screws (e.g., screw 130 and screw 132). With the switch in the "on" position the circuit is closed, connecting point "A" and point "B", and thus there is current flow between the two contact screws (e.g., screw 142 and screw 144).

Returning to FIG. 1A, the two-way switch 112 receives power from an electrical feed 116 which originates at a breaker panel. Electrical feed, especially as used in residential applications, often comprises ROMEX cable. ROMEX is a non-metallic sheathed cable which comprises two or more insulated conductors. The insulated conductors also have an outer sheath which is moisture resistant and non-metallic. The insulation for the individual conductors may comprise rubber, neoprene, thermoplastic, or a moisture resistant flame retardant fibrous material. A wide variety of ROMEX cable is available, thus each type of ROMEX cable is designated by a numerical code such as "12-2". The first number (12) refers to a gauge (i.e., diameter) of one of the individual conductors within the ROMEX cable, wherein increasing gauge numbers signify decreasing conductor diameter. The second number (2) in the numerical code refers to a number of insulated conductors within the ROMEX cable. However, ROMEX cable also comprises a non-insulated, or sometimes insulated, ground conductor that is not counted for purposes of calculating the second number of the numerical code. For the purposes of this disclosure, ROMEX cable will be equivalently referred to as ROMEX.

The electrical feed 116 enters the junction box 110 by way of a first opening 115 and comprises 12-2 ROMEX which comprises a "Hot" conductor 119 (denoted "H" in FIGS. 1B, 1C, 2A, 2B, and 3A), a "Neutral" conductor 121 (denoted "N" in FIGS. 1B, 1C, 2A, 2B, and 3A), and a "Ground" conductor 123 (denoted "G" in FIGS. 1B, 1C, 2A, 2B, and 3A). Also, a first end 141 of an electrical feed 118 enters the junction box 110 by way of a second opening 117 and comprises 12-2 ROMEX which comprises a "Switch" conductor 129 (denoted "S" in FIGS. 1B, 1C, 2A, 2B, and 3A), a "Neutral" conductor 125 (denoted "N" in FIGS. 1B, 1C, 2A, 2B, and 3A), and a "Ground" conductor 127 (denoted "G" in FIGS. 1B, 1C, 2A, 2B, and 3A). A second end 143 of the electrical feed 118 enters the junction box 120 by way of an opening 145. In some cases, other types of ROMEX (e.g., 12-3, 14-2, 14-3, etc.) or non-ROMEX cable may be used.

As shown, the Hot conductor 119 is coupled to the first contact screw 130, wherein the Hot conductor 119 is looped around the first contact screw 130 and the first contact screw 130 is tightened onto the looped Hot conductor 119. The Neutral conductor 121 is coupled to the Neutral conductor 125 by way of a pigtail 131 in order to extend the circuit, wherein the Neutral conductor 125 is run through the electrical feed 118 to the junction box 120. Pigtails may be used to extend a circuit, consolidate conductors, or for making short branches (e.g., when jumping power between adjacent switches, for example, in a ganged configuration). The pigtail 131 comprises a screw-on electrical twist-on wire connector 133 that may be made from plastic having a tapered, conducting metal coiled insert that threads onto conductors inserted into the twist-on wire connector 133. Some types of twist-on wire connectors may not have the conducting metal coil, and instead simply use molded plastic threads within the interior of the twist-on wire connector. The Ground conductor 123 is coupled to the Ground conductor 127 and conductor 135 by way of a pigtail 137 comprising a screw-on electrical twist-on wire connector 139. In this instance, the pigtail 137 is used both to extend the circuit, wherein the Ground conductor 127 is run through the electrical feed 118 to the junction box 120, and to consolidate the ground conductors so that only one conductor (conductor 135) couples to the ground screw 134, wherein the conductor 135 is looped around the ground screw 134 and the ground screw 134 is tightened. The second contact screw 132 is tightened onto the Switch conductor 129 which has been looped around the second contact screw 132 and which is run through the electrical feed 118 to the junction box 120.

The two-way switch 112 controls power to a lamp 146, which is coupled to the light fixture 122, by way of the electrical feed 118. In particular, the Switch conductor 129 is coupled to a Switch conductor 149, which further couples to the light fixture 122, by way of a pigtail 150 comprising a nut connector 152. Thus, the collective "Switch" conductor, comprising Switch conductor 129 and Switch conductor 149, controls whether the lamp 146 is "on" or "off" by way of the two-way switch 112 which operates as described with reference to FIG. 1E. The Neutral conductor 125 is coupled to a Neutral conductor 151, which further couples to the light fixture 122, by way of a pigtail 154 comprising a nut connector 156. The Ground conductor 127 couples to a ground screw 148 which is coupled to the metallic junction box 120. The light fixture 122 also comprises a Ground conductor 153 which is coupled to the ground screw 148. In some configurations, the Ground conductor 127 and the Ground conductor 153 may be consolidated by way of a pigtail before being coupled to the ground screw 148.

Figure 1B:
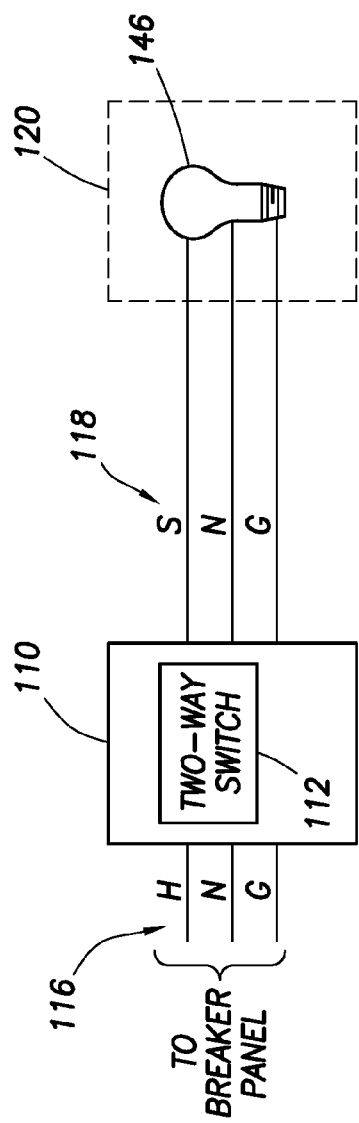

FIG. 1B illustrates a simplified schematic representative of the electrical circuit 100 as shown in FIG. 1A. The schematic illustrates the junction box 110 comprising the two-way switch 112 which receives power from the electrical feed 116. The electrical feed 116 originates at the breaker panel, is coupled to the junction box 110, and comprises the Hot (H), Neutral (N), and Ground (G) conductors. The two-way switch 112 controls the lamp 146 by way of the electrical feed 118, which is coupled to the junction box 120. The electrical feed 118 comprises the Switch (S), Neutral (N), and Ground (G) conductors. The junction box 120, illustrated herein by a dashed line, is omitted from the schematics that follow to allow for greater clarity in the discussion.

Figure 1C:
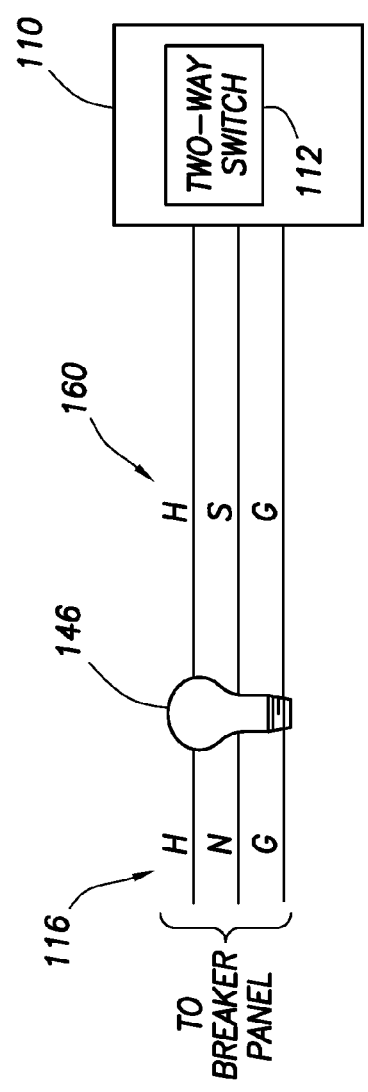

With the understanding provided by the electrical circuit 100 of FIG. 1A and the associated schematic of FIG. 1B, various wiring schematics are presented to further develop the desirability of having at least six electrically conductive paths within an electrical junction box. In particular, FIG. 1C shows a schematic comprising an alternative wiring scheme for the circuit illustrated in FIG. 1B. As illustrated, the electrical feed 116 first couples to the lamp 146 by way of a junction box (not shown) and a light fixture (not shown) instead of first coupling to the junction box 110. In such a configuration, the Neutral conductor need not be run to the junction box 110, but instead can be terminated at the lamp 146. However, in some configurations the Neutral conductor may be run to junction boxes even when it is not necessary to do so in order to allow for easier accessibility, as the Neutral conductor may be needed in different circuits throughout the home or business. Electrical feed 160, which couples the lamp 146 to the two-way switch 112 by way of the junction box 110, comprises Hot (H), Switch (S), and Ground (G) conductors. The circuits using a two-way switch as illustrated in FIG. 1 therefore have introduced a total of four different conductors; namely Hot (H), Neutral (N), Switch (S), and Ground (G). Circuits using three-way switches introduce additional conductors.

FIGS. 2A and 2B illustrate circuit configurations employing three-way switches. A three-way switch (e.g., single-pole-double-throw (SPDT) switch). Three-way switches are used in order to control a single light fixture or electrical receptacle by way of two different switches. For example, two different switches at the top and bottom of a stairwell are often used to control a single light fixture for the stairwell. A three-way switch 240 (in a first position) is illustrated in FIG. 2C. The three-way switch 240 comprises a first contact screw 242, a second contact screw 244, and a common screw 246. The common screw 246 is often colored differently than the other two screws for identification purposes. Also, the three-way switch 240 may or may not comprise a grounding screw. Operation of a three-way switch is illustrated in FIG. 2D. Specifically, with the switch in the first position contact is made between point 246A and point 244B, and thus there is current flow between the common screw 246 and the second contact screw 244. With the switch in a second position contact is made between point 246A and point 242C, and thus there is current flow between the common screw 246 and the first contact screws 242. In an alternative configuration, contact may be made between points 246A and 244B when the switch is in the second position, and contact may be made between points 246A and 242C when the switch is in the first position.

FIG. 2A illustrates a schematic representative of an electrical circuit comprising a junction box 210 and a three-way switch 212 which receives power from an electrical feed 216. The electrical feed 216 originates at a breaker panel, is coupled to the junction box 210, and comprises the Hot (H), Neutral (N), and Ground (G) conductors. As three-way switches are used in pairs, the three-way switch 212 is coupled to a three-way switch 222 by way of an electrical feed 217 which couples to a junction box 220. Electrical feed between three-way switches, and in this example the electrical feed 217, comprises three insulated conductors plus ground (e.g., 12-3 or 14-3 ROMEX). In particular, the electrical feed 217 comprises a Transfer (or Traveler) conductor 1 (T1), a Transfer conductor 2 (T2), a Neutral (N) conductor, and a Ground (G) conductor. The T1 conductor may be used to couple a first contact screw of the three-way switch 212 to a first contact screw of the three-way switch 222, and the T2 conductor may be used to couple a second contact screw of the three-way switch 212 to a second contact screw of the three-way switch 222. The Hot (H) conductor of the electrical feed 216 may then be connected to a common screw of the three-way switch 212, and the Switch (S) conductor of an electrical feed 218 may be connected to a common screw of the three-way switch 222 wherein the electrical feed 218 further comprises a Neutral (N) conductor and a Ground (G) conductor. Thus, the pair of three-ways switches 212 and 222 control a lamp 230 from two different locations and by way of the electrical feed 218, which is coupled to the junction box 220. When using three-way switches as illustrated in FIGS. 2A and 2B (discussed below), one three-way switch is designated as a "primary" and one is designated as a "secondary", wherein the secondary is the switch that is coupled directly to the lamp 230. Thus, in FIG. 2A, the three-way switch 212 is the primary, and the three-way switch 222 is the secondary.

FIG. 2B illustrates a schematic comprising an alternative wiring scheme for the circuit illustrated in FIG. 2A. As shown, the electrical feed 216 first couples to the lamp 230 by way of a junction box (not shown) and a light fixture (not shown) instead of first coupling to the junction box 210. In such a configuration, the Neutral conductor need not be run to the junction box 210, but instead can be terminated at the lamp 230. Electrical feed 221, which couples the lamp 230 to the three-way switch 212 by way of the junction box 210, comprises Hot (H), Switch (S), and Ground (G) conductors. Electrical feed 223, which couples the pair of three-way switches 212 and 222 by way of the junction boxes 210 and 220, comprises Transfer 1 (T1), Transfer 2 (T2), Ground (G) and Switch (S) conductors. As illustrated in FIG. 2, circuits using three-way switches introduce conductors with two new names (T1 and T2). Alternating the physical use of T1 or T2 with Hot or Neutral conductors, as may be done in existing systems, in addition to the various wiring schemes that can be implemented (two of which are shown in FIGS. 2A and 2B), greatly increases the complexity of wiring in residential or commercial applications, and further underscores the desirability of having junction boxes with dedicated conductive paths for each type of conductor. Also, the increase in the number and types of conductors that may need to be connected within a junction box further highlights the desirability of having quick and easy couplings between the individual conductors of the electrical feed and the junction boxes.

The circuits as illustrated in FIGS. 1 and 2, and a host of other permutations of those circuits, can be implemented with no more than six dedicated conductors; namely Hot (H), Neutral (N), Switch (S), Transfer 1 (T1), Transfer 2 (T2), and Ground (G). Systems that accommodate at least these six conductors account for a majority of electrical circuits encountered in a residential or commercial setting. There is at least one exception (four-way switches, discussed below), wherein eight types of conductors are used in the implementation of the circuit. Thus, in some embodiments of the present invention, the modular wiring system comprises an electrical junction box and an electrical backing insert, wherein the electrical backing insert comprises at least six electrically conductive paths, and wherein each of the at least six electrically conductive paths is dedicated to a particular function.

FIG. 3A illustrates a schematic representative of an electrical circuit comprising a four-way switch 322. A four-way switch may be equivalently referred to as a double-pole-double-throw (DPDT) switch. Four-way switches are used in order to be able to control a single light fixture or electrical receptacle by way of three different switches. A single four-way switch is used together with a pair of three-way switches. A four-way switch 350 (in a first position) is illustrated in FIG. 3B. The four-way switch 350 comprises a first contact screw 352, a second contact screw 354, a third contact screw 356, and a fourth contact screw 358. Also, the four-way switch 350 may or may not comprise a grounding screw. Operation of a four-way switch is illustrated in FIG. 3C. Specifically, with the switch in the first position contact is made between points 352A and 354B, and between points 356C and 358D, thus there is current flow between the first contact screw 352 and the second contact screw 354, and there is current flow between the third contact screw 356 and the fourth contact screw 358. With the switch in a second position contact is made between points 352A and 358D, and between points 356C and 354B, thus there is current flow between the first contact screw 352 and the fourth contact screw 358, and there is current flow between the third contact screw 356 and the second contact screw 354. In an alternative configuration, the first and second positions may be switched.

Returning to FIG. 3A, junction box 310 has therein a three-way switch 312 which receives power from an electrical feed 315. The electrical feed 315 originates at a breaker panel, is coupled to the junction box 310, and comprises the Hot (H), Neutral (N), and Ground (G) conductors. The three-way switch 312 is coupled to a four-way switch 322 by way of an electrical feed 317 which couples to a junction box 320. The electrical feed 317 comprises a Transfer 1 (T1) conductor, a Transfer 2 (T2) conductor, a Neutral (N) conductor, and a Ground (G) conductor, all as previously discussed. The T1 conductor may be used to couple a first contact screw of the three-way switch 312 to a first contact screw of the four-way switch 322, and the T2 conductor may be used to couple a second contact screw of the three-way switch 312 to a second contact screw of the four-way switch 322. The Hot (H) conductor of the electrical feed 315 may then be connected to a common screw of the three-way switch 312. The four-way switch 322 is then coupled to a three-way switch 332 by way of an electrical feed 319 which couples to a junction box 330. The electrical feed 319 comprises two new dedicated conductors, a Transfer 3 (T3) conductor and a Transfer 4 (T4), along with a Neutral (N) conductor, and a Ground (G) conductor. The T3 conductor may be used to couple a third contact screw of the four-way switch 322 to a first contact screw of the three-way switch 332, and the T4 conductor may be used to couple a fourth contact screw of the four-way switch 322 to a second contact screw of the three-way switch 332. The three-way switch 332 is then coupled to a lamp 340 by way of an electrical feed 321. The electrical feed 321 comprises a Switch (S), a Neutral (N), and a Ground (G) conductor. In particular, the Switch (S) conductor of the electrical feed 321 may be coupled to a common screw of the three-way switch 332. Thus, the pair of three-ways switches 312 and 332, and a four-way switch 322, are used to control the lamp 340 from three different locations. With the introduction of T3 and T4, at least some embodiments utilize eight wire systems.

Figure 4:
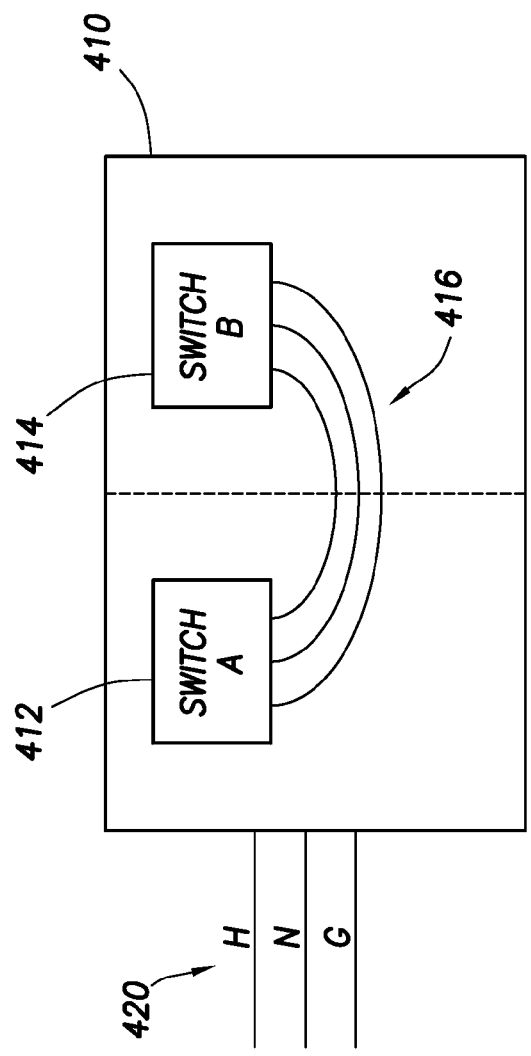
FIG. 4 illustrates a jumper configuration.

In some wiring configurations, there may be two or more switches or receptacles at a single junction box location. In such situations, a multiple ganged junction box may be used. FIG. 4 illustrates a two-gang junction box 410 comprising a first switch 412 and a second switch 414. In some configurations, the first switch 412 receives power from an electrical feed 420. In order to distribute power to the second switch 414, jumpers 416 distribute the Hot (H), Neutral (N), and Ground (G) conductors. This method of distributing power between ganged switches or receptacles is time-consuming, and complicated and dangerous due to the additional wires involved. It would be desirable to provide a quick, easy, and efficient way to jumper power across such ganged switches or receptacles. Thus, in at least some embodiments, a pre-fabricated, rigid insulated conductor is provided that couples between electrical backing inserts within the junction box and provides a safe and easy way to distribute the Hot (H), Neutral (N), and Ground (G) conductors, or any other conductor as desired.

Figure 5D:
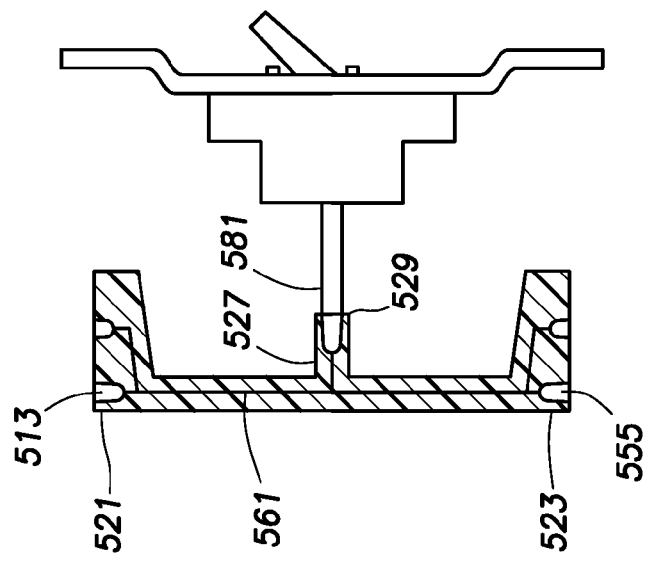
FIG. 5 (comprising FIGS. 5A-5F) illustrates a modular wiring system in accordance with embodiments of the invention.
Figure 5A:
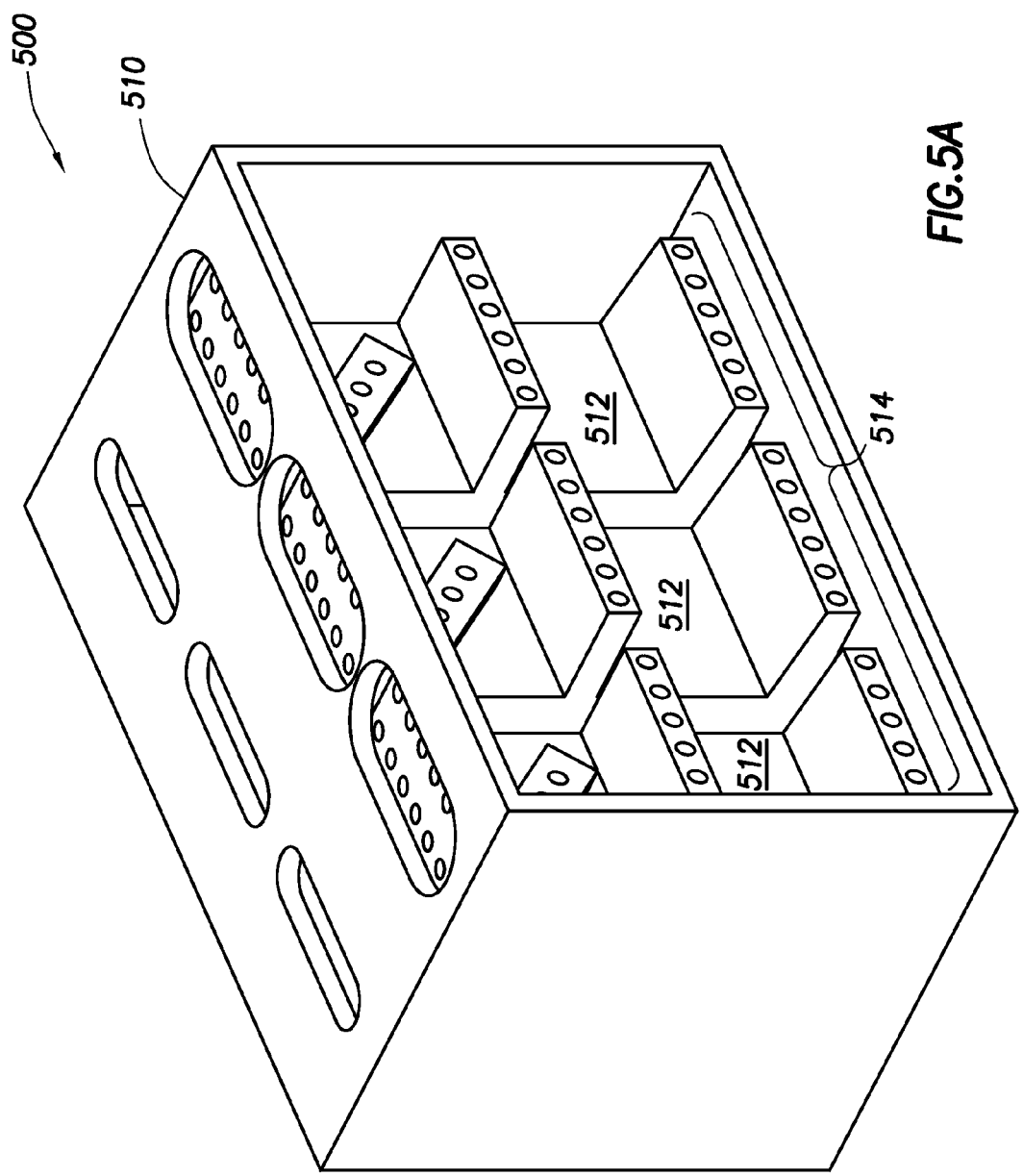

FIG. 5A illustrates a modular wiring system 500 in accordance with at least some embodiments. In particular, the modular wiring system 500 comprises an electrical junction box 510 and a plurality of electrical backing inserts 514 coupled within the junction box 510. While the modular wiring system 500 of FIG. 5A comprises a three-gang configuration, in alternative embodiments the modular wiring system 500 may comprise fewer or more than three electrical backing inserts (e.g., a one-gang, two-gang or a four-gang configuration among others). FIG. 5B illustrates the junction box 510 without any electrical backing inserts. In particular, the junction box 510 comprises a first side wall 520, a second side wall 524, a third side wall 526, a fourth side wall 528, and a back wall 522. The side walls and the back wall 522 define an internal cavity or volume wherein a single electrical backing insert or a plurality of electrical backing inserts may be coupled. The electrical backing inserts can be fixedly or releasably coupled within the internal cavity of the junction box 510 by way of, for example, a screw, a tab, a clip, or other coupling mechanism. The first side wall 520 comprises at least one opening 530. In some illustrative embodiments, the second side wall 524 also comprises at least one opening 540. The openings provide access to an interior of the junction box 510, and in particular the openings provide access to an electrical backing insert that is coupled within the junction box 510. The openings can be round, oval, square, rectangular, or any other shape in order to accommodate a variety of connection types.

Figure 5C:
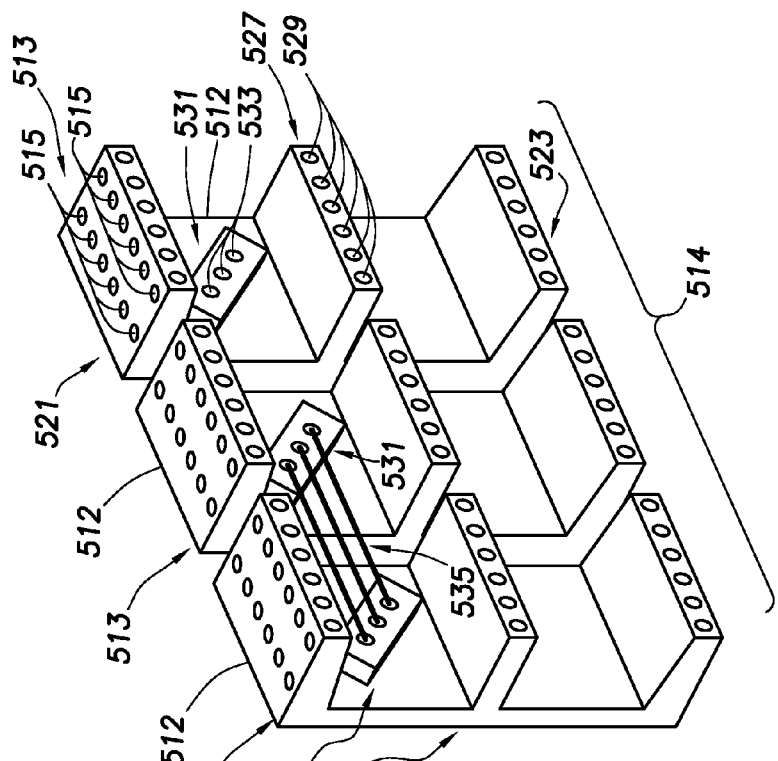
Figure 5B:
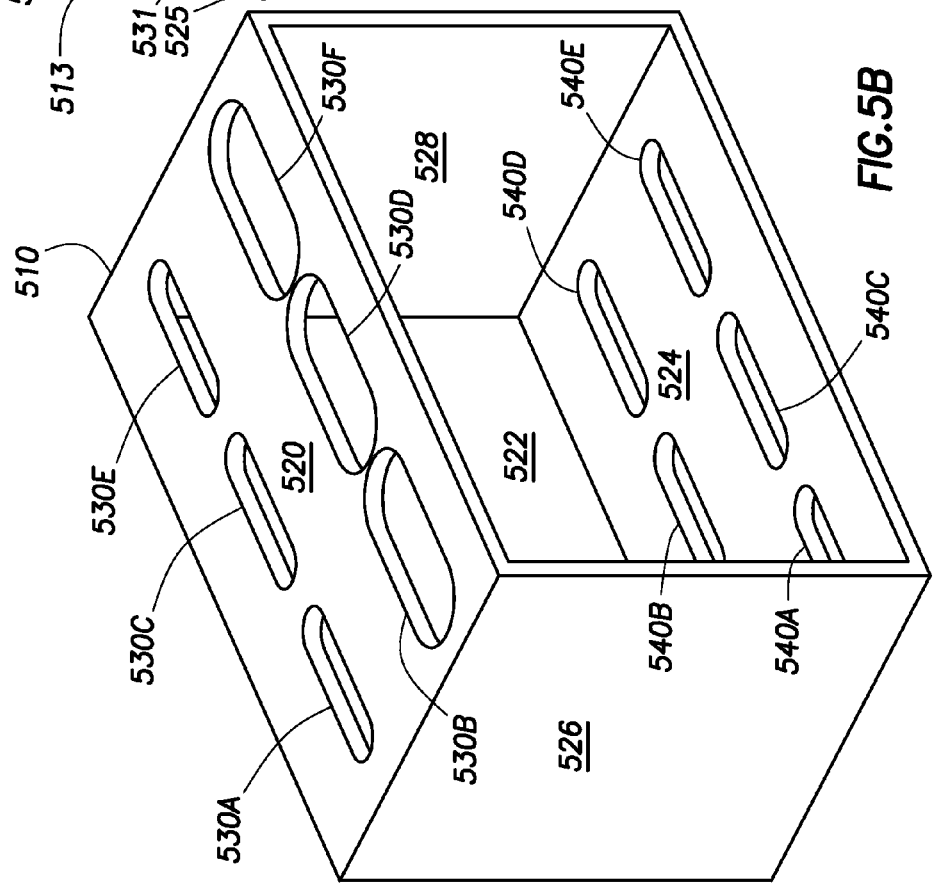

FIG. 5C illustrates the plurality of electrical backing inserts 514, where each individual electrical backing insert 512 comprises at least six electrically conductive paths that are accessible by way of a connector 513 located at a first end 521 of the electrical backing insert 512. Each connector 513 in these embodiments comprises at least six contact positions, wherein each contact position 515 provides access to one electrically conductive path. The conductive path is integral to the electrical backing insert 512, and each of the at least six electrically conductive paths extends from the first end 521 to at least a medial portion 525 of the electrical backing insert 512. In some embodiments, the electrical backing insert 512 further comprises a connector having at least six contact positions (not visible in FIG. 5C) located at a second end 523 of the electrical backing insert 512, and where each of the at least six electrically conductive paths extends from the first end 521 to the second end 523 of the electrical backing insert 512. The contact positions 515 are accessible through the apertures 530. In some embodiments, an individual opening provides access only to a row of contacts 515, and in alternative embodiments an individual opening may provide access to or expose both rows of contacts 515. The explanation regarding access to the contacts 515 is equally applicable to contacts on the second end 523 of each electrical backing insert 512, and thus there may be four openings to expose contacts of a particular electrical backing insert 512 (i.e., four openings per gang).

Each electrical backing insert 512 further comprises a component interface 527, with the component interface comprising at least six receiving apertures 529. Each of the at least six receiving apertures 529 is in operational relationship and electrically coupled one each to each of the at least six electrically conductive paths. In some embodiments, the component interface 527 is disposed at approximately the medial portion 525 of the electrical backing insert 512. As will be discussed more below, externally accessible devices (e.g., switches, receptacles) couple to the electrical backing inserts by way of the component interfaces. Each electrical backing insert 512 also comprises a jumper interface 531 which comprises at least three contact positions 533. Insulated, rigid conductors or jumpers 535, individually or as an integrated package, can be used to couple the contact positions 533 of different electrical backing inserts, thus distributing electrical signals across a multiple gang junction box. In some exemplary embodiments, the jumpers 535 are used to distribute Hot (H), Neutral (N), and Ground (G) conductors. In other embodiments, the jumpers 535 are used to distribute other electrical signals.

FIG. 5D illustrates a side, cross-sectional view of an electrical backing insert 512 comprising a first end 521 and a second end 523. The electrical backing insert 512 further comprises a first connector 513 and a second connector 555, wherein the first and second connectors are configured to receive a mating connector through a first opening (e.g., aperture 530 of FIG. 5B) and a second opening (e.g., aperture 540 of FIG. 5B), and wherein the mating connector couples to a cable (e.g., ROMEX cable) comprising a plurality of wires (i.e., electrical conductors). The electrical backing insert 512 also comprises a component interface 527 having connector 529 which receives one or more selected from the group consisting of: a light switch; a three way light switch; a four way light switch; an electrical outlet; a rheostat; a device configured to couple power to a lighting device; a device configured to couple power to a ceiling fan; a test plug configured to check the system for errors; or a test switch configured to check the system for errors. As shown, a switch 580 comprising a mating terminal 581 is coupled to the component interface 527, wherein the connector 529 receives the mating terminal 581. The connectors 513, 529, and 555 are coupled to an electrically conductive path 561. The electrically conductive path 561 is illustrated as a solid line; however, it may not be visible from outside the electrical backing insert 550. In some embodiments, the electrical backing insert may be fabricated from a clear plastic or other transparent material, thus allowing the conductive path 561 to be visible from outside the electrical backing insert 512. In other embodiments, the electrical backing insert may be fabricated without a back plane, thus allowing the conductive paths to be visible. FIG. 5E illustrates a back view of the electrical backing insert 512 comprising six electrically conductive paths 561, 563, 565, 567, 569, and 571, wherein each of the electrically conductive paths extends from the first end 521 to the second end 523 of the electrical backing insert 512. FIG. 5F illustrates a back view of an electrical backing insert 582 comprising eight electrically conductive paths. As in FIG. 5D, the electrically conductive paths in FIGS. 5E and 5F may not be visible from outside the electrical backing insert. Each of the electrically conductive paths is isolated from each other; thus, each of the at least six electrically conductive paths, or each of the at least eight electrically conductive paths, can be dedicated to a particular function. In other embodiments, the electrical backing insert may comprise more or less than six electrically conductive paths. In addition, the electrical backing insert is configured such that there are no exposed conducting surfaces on the front of the insert (i.e., facing the opening of the junction box), thus protecting the user from electrical shock. Further, because all connections are made by way of the electrical backing insert, there are neither loose wires in the junction box, nor any user performed internal wiring connections to be made in the field. Moreover, in some embodiments the electrical backing inserts may be color coded based on the desired functionality. For example, a red electrical backing insert may signify the location of a primary switch, yellow for a secondary switch, and green for receptacle or other use.

Figure 6:
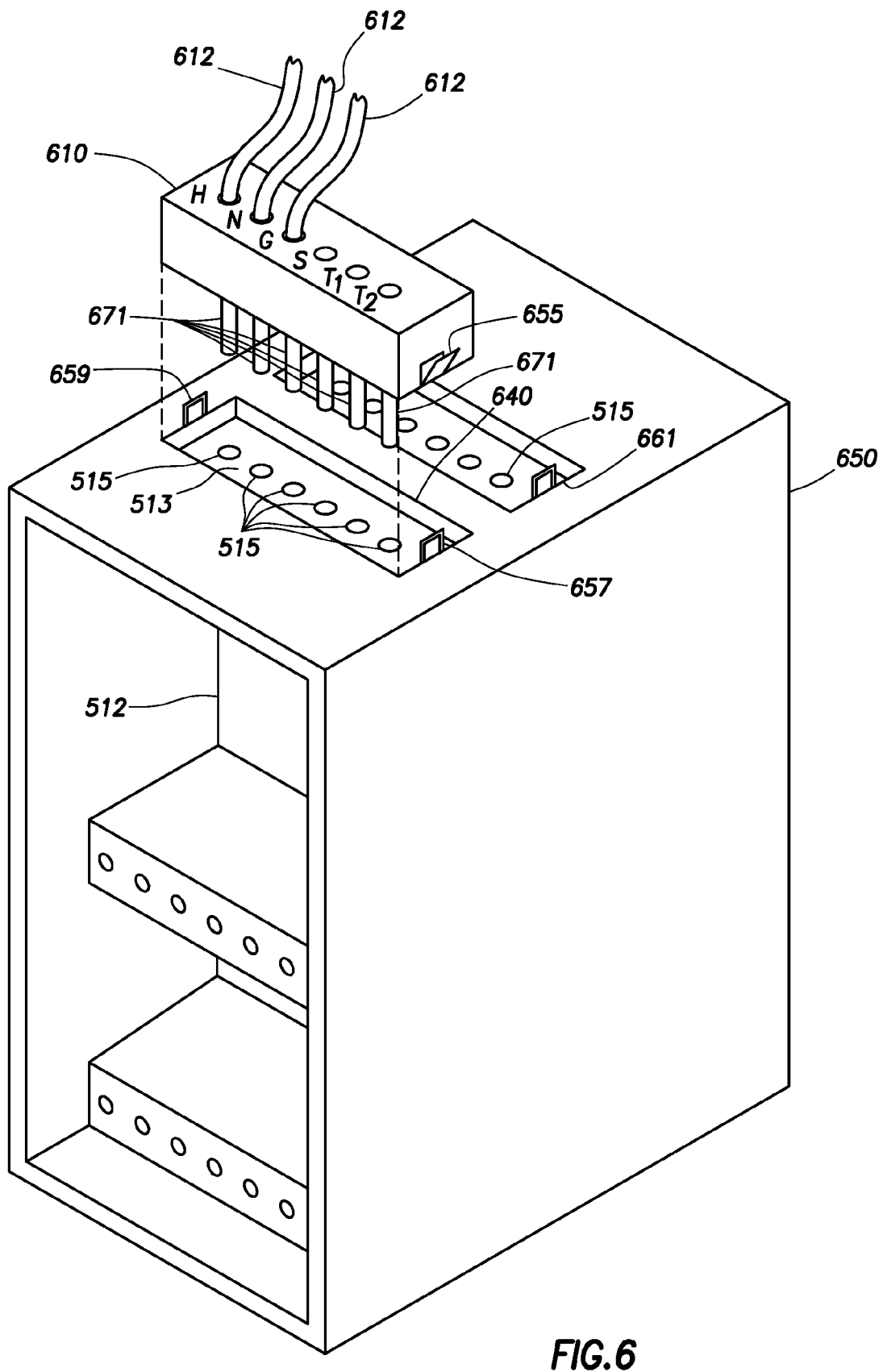
FIG. 6 illustrates a connector as used in accordance with embodiments of the invention.

While in some embodiments the conductors of a ROMEX or other cable may stab directly into the connectors 515, FIG. 6 illustrates embodiments where the ROMEX couples to an electrical backing insert 512 by way of a connector 610. The connector 610 couples to individual conductors 612 of a ROMEX cable. The connector 610 is configured to couple to the connector 513 (in particular the contact positions 515) by way of terminals 671, where each terminal couples within a single contact position. The connector 610 is configured to couple to the connector 513 through first opening 640, which in these embodiments illustrates an opening that exposes only a single row of contact positions 515. In some embodiments, the connector 610 is held securely in place by a first locking tab 655 and a second locking tab (not shown) disposed on either end of the mating connector 610, wherein the first locking tab 655 latches fixedly to a first latch member 657, and wherein the second locking tab latches fixedly to a second latch member 659. As shown, each of the terminals 671 of the mating connector 610 is dedicated to a particular type of conductor (H, N, G, S, T1, or T2), and thus to a particular function. In some embodiments, the at least six electrically conductive paths of the electrical backing insert 512 are arranged in a predetermined sequence to allow for reliable and consistent connections to the connector 513, and thus to the junction box 650, by way of the mating connector 610. FIG. 7 also illustrates embodiments where each row of the contact positions 515 are visible through distinct opening, and in the case of the second row the contacts 515 are visible opening 661.

FIG. 7 illustrates a method in accordance with at least some embodiments. In particular, the method starts (block 700) and proceeds to attaching an electrical box or electrical junction box to a structural member (block 704). The attaching may be by way of any form of fastener (e.g., nail, screw or adhesive). Moreover, the structural member to which the electrical box attaches may take many forms, such as a wooden or metallic wall stud, or the electrical box may be structurally supported by surrounding wall board. Regardless of the method of attachment or to what device the electrical box is attached, an electrical backing insert (also known as a backing insert) is placed in the electrical box (block 708). The electrical backing insert may take many forms, such as those described with respect to FIGS. 5A-5C comprising a plurality of electrical conductors.

Next, a plurality of wires or conductors of a first cable are coupled to the electrical backing insert (block 712). The coupling of the wires to the electrical backing insert is through an aperture of the electrical box, and the location on the electrical backing insert to which each respective wire couples is selected based on a function to be performed by the electrical box. For example, if the cable is the power feed from the breaker panel, the conductors may couple to the Hot "H", Neutral "N" and Ground "G" feed points of the electrical backing insert. As yet another example, if the cable is used as the feed from the control electrical box to a second electrical box having a light, the conductors may couple to the Switch "S", Neutral "N" and Ground "G" feed points.

Next, an externally accessible device is coupled into the electrical box (block 716), and the process ends (block 720). In at least some embodiments, the act of inserting the externally accessible device couples the externally accessible device to at least some of the electrical conductors of the electrical or backing insert. The externally accessible device inserted into electrically communication with the backing insert may take many forms. For example, the externally accessible device may comprise: a 120 Volt electrical outlet; a device configured to couple power to a lighting device (two-way, three-way or four-way switch); a device configured to couple power to a ceiling fan; a test plug configured to check the wiring system for errors; or a test switch configured to check the system for errors.

The above discussion is meant to be illustrative of the principles and various embodiments of the present invention. Numerous variations and modifications will become apparent to those skilled in the art once the above disclosure is fully appreciated. For example, a ground-fault interrupter (GFCI) circuit or automation circuitry (e.g., X10 automation) can be added within the junction box (e.g., coupled to a portion of the electrical backing insert). In addition, a light emitting diode embedded in the electrical backing insert that emits light when the electrical backing insert is energized can provide additional safety to the system. Also, in some embodiments, a telephone or data jack may be coupled within the junction box. Further still, to reduce the risk of electrical sparks emerging from a junction box and igniting surrounding material, one or more seals may be used to seal unused openings in a junction box. It is intended that the following claims be interpreted to embrace all such variations and modifications.

What is claimed is:

1. A system comprising:
    an electrical box having a first side wall, a second side wall and a back, the side walls and the back define an internal cavity, and an opening through the first side wall; and
    an electrical backing insert comprising at least six electrically conductive paths, the at least six electrically conductive paths extending from a first end of the electrical backing insert to at least a medial portion of the electrical backing insert;
    wherein the electrical backing insert is releasably coupled within the internal cavity, and the electrical backing insert is configured to couple to and be operational with a single-pole-single-throw switch when the single-pole-single-throw switch is present, and the electrical backing insert is configured to couple to and be operational with an electrical outlet when the electrical outlet is present; and
    wherein the at least six electrically conductive paths on the first end of the electrical backing insert are accessible through the opening on the first sidewall.

2. The system according to claim 1 wherein the first end of the electrical backing insert further comprises a connector that receives a mating connector through the opening in the first sidewall, the mating connector couples to a cable comprising a plurality of wires.

3. The system according to claim 1 further comprising:
    an opening through the second sidewall; and
    said electrical backing insert having a second end, and wherein each of the at least six electrically conductive paths extend to the second end of the electrical backing insert, the second end opposite the first end;
    wherein the at least six electrically conductive paths are accessible through the opening in the second sidewall.

4. The system according to claim 3 wherein the second end of the electrical backing insert further comprises a connector that receives a mating connector through the opening in the second sidewall, the mating connector couples to a cable comprising a plurality of wires.

5. The system according to claim 3 further comprising:
    a second opening through the first sidewall;
    a second opening through second sidewall;
    wherein the at least six electrically conductive paths are accessible through the opening and the second opening in the first sidewall; and
    wherein the at least six electrically conductive paths are accessible through the opening and the second opening in the second sidewall.

6. The system according to claim 1 wherein each of the at least six electrically conductive paths is dedicated to a particular function.

7. The system according to claim 1 further comprising a ground-fault circuit interrupter (GFCI) circuit coupled to the electrical backing insert.

8. The system according to claim 1 further comprising automation circuitry coupled to the electrical backing insert.

9. The system according to claim 1 further comprising the electrical backing insert comprises a color that denotes a type of externally accessible device to which to couple to the electrical backing insert.

10. The system according to claim 1 further comprising at least eight electrically conductive paths.

11. The system according to claim 1 further comprising a telephone or data jack.

12. A system comprising:
    an electrical box having a first side wall, a second side wall and a back, the side walls and the back define an internal cavity, and an opening through the first side wall; and
    an electrical backing insert comprising at least six electrically conductive paths, the at least six electrically conductive paths extending from a first end of the electrical backing insert to at least a medial portion of the electrical backing insert;

wherein the electrical backing insert is releasably coupled within the internal cavity, and wherein the at least six electrically conductive paths on the first end of the electrical backing insert are accessible through the opening on the first sidewall; and wherein the electrical backing insert further comprises a component interface comprising at least six receiving apertures, each of the at least six receiving apertures in operational relationship to one of the at least six electrically conductive paths.

13. The system according to claim 12 wherein the component interface is disposed at approximately a medial portion of the electrical backing insert.

14. The system according to claim 12 wherein the component interface is configured to receive one or more selected from the group consisting of: a light switch; a three way light switch; a four way light switch; an electrical outlet; or a rheostat.

15. A system comprising:
an electrical box having a first side wall, a second side wall and a back, the side walls and the back define an internal cavity, and an opening through the first side wall; and
an electrical backing insert internally comprising at least six electrically conductive paths, the at least six electrically conductive paths extending from a first end of the electrical backing insert to at least a medial portion of the electrical backing insert;
wherein the electrical backing insert is releasably coupled within the internal cavity, and wherein the at least six electrically conductive paths on the first end of the electrical backing insert are accessible through the opening on the first sidewall; and
wherein the electrical backing insert further comprises a jumper interface.

16. The system according to claim 15 further comprising:
a second electrical backing insert releasably coupled within the internal cavity, at least one rigid conductor that couples the electrical backing insert to the second electrical backing insert by way of the jumper interface.

17. A method comprising:
attaching an electrical box to a structural member, the electrical box having a first side wall, a second side wall and a back, and the side walls define an opening;
placing through the opening a backing insert into the electrical box, the backing insert comprising at least six electrical conductors;
coupling a plurality of wires of a first cable to the backing insert, the coupling through a first aperture of the electrical box, and each of the plurality of the wires of the first cable selectively coupled one each to the at least six electrical conductors, the selective coupling based on a function to be performed by the electrical box; and
inserting through the opening any one of both a single-pole-single-throw switch and a electrical outlet into the backing insert, the act of inserting couples the single-pole-single-throw switch and the electrical outlet to at least some of the electrical conductors of the backing insert.

18. The method according to claim 17 wherein inserting through the opening further comprises inserting one or more selected from the group consisting of: a device configured to couple power to a lighting device; a device configured to couple power to a ceiling fan; a test plug configured to check the system for errors; or a test switch configured to check the system for errors.

19. The method according to claim 17 further comprising coupling a plurality of wires of a second cable to the backing insert, the coupling through a second aperture of the electrical box, and the wires of the second cable coupled to particular electrical conductors of the backing insert based on the function to be performed.

20. The method according to claim 19 further comprising one or more selected from the group consisting of: coupling the second cable to a device; coupling the cable to a device that participates in control of a third device; coupling the second cable to a device that shares a common power source.

* * * * *